(12) United States Patent
Armstrong-Muntner

(10) Patent No.: US 10,036,907 B2
(45) Date of Patent: Jul. 31, 2018

(54) ELECTRONIC EQUIPMENT WITH STATUS INDICATORS

(71) Applicant: Apple Inc., Cupertino, CA (US)

(72) Inventor: Joel S. Armstrong-Muntner, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 608 days.

(21) Appl. No.: 13/627,464

(22) Filed: Sep. 26, 2012

(65) Prior Publication Data
US 2014/0085269 A1   Mar. 27, 2014

(51) Int. Cl.
G06F 3/033 (2013.01)
G06F 3/038 (2013.01)
G02F 1/1333 (2006.01)
G06F 3/0354 (2013.01)

(52) U.S. Cl.
CPC ........ *G02F 1/1333* (2013.01); *G06F 3/03545* (2013.01)

(58) Field of Classification Search
CPC .... G06F 1/1647; G06F 1/1692; G06F 1/1684; G06F 3/03545; G06F 3/038; G06F 3/0383
USPC ............................. 345/179; 178/19.01–19.06
See application file for complete search history.

(56) References Cited

U.S. PATENT DOCUMENTS

| | | | |
|---|---|---|---|
| 3,639,640 A * | 2/1972 | Gager et al. | G03G 5/0217 346/135.1 |
| 6,216,490 B1 | 4/2001 | Radley-Smith | |
| 6,441,362 B1 * | 8/2002 | Ogawa | G06F 3/03545 178/19.04 |
| 6,621,697 B2 | 9/2003 | O'Hara et al. | |
| 7,184,033 B2 | 2/2007 | Burrus, IV et al. | |
| 7,336,338 B2 | 2/2008 | Czyzewski | |

(Continued)

FOREIGN PATENT DOCUMENTS

EP   2045695   4/2009

OTHER PUBLICATIONS

Hilltrend Ltd. Co.: "Solar Power LCD Key Chain", 1-13 Internet Citation, Retrieved from the Internet:URL:http://www.hilltrend.com/solar_power_lcd_key_chain.htm [retrieved on Aug. 22, 2012].

(Continued)

*Primary Examiner* — Srilakshmi K Kumar
*Assistant Examiner* — Jeffrey S Steinberg
(74) *Attorney, Agent, or Firm* — Treyz Law Group, P.C.; G. Victor Treyz; Joseph F. Guihan

(57) ABSTRACT

Electronic equipment such as a computer tablet stylus, computing equipment, or other electronic devices may be provided with status indicators. A status indicator may be formed from a layer of liquid crystal material interposed between a pair of polarizers. Electrode structures may be used to apply electric fields to the liquid crystal material to place the status indicator in an opaque state or a transparent state. A colored structure or other structure may be placed under the liquid crystal material to allow the status indicator to change between a dark or diffuse to colored appearance. The status indicator may be provided in the shape of a ring that extends around the perimeter of a cylindrical stylus. Multiple status indicators may be grouped in a cluster to serve as an analog gauge. Light guide structures and light sources may provide illumination for the status indicators.

22 Claims, 21 Drawing Sheets

(56) References Cited

U.S. PATENT DOCUMENTS

| | | | | |
|---|---|---|---|---|
| 7,436,393 B2* | 10/2008 | Hong | ...................... | G06F 3/045 178/18.01 |
| 7,960,684 B2* | 6/2011 | Payne | ................... | G06F 1/1616 250/227.26 |
| 8,520,154 B2* | 8/2013 | Wu | ..................... | G02F 1/13338 345/173 |
| 2003/0030595 A1* | 2/2003 | Radley-Smith | ...... | A44C 5/0007 345/1.3 |
| 2003/0099887 A1* | 5/2003 | Lu | ......................... | G02B 5/201 430/7 |
| 2004/0062036 A1* | 4/2004 | Kuo | ...................... | B43K 29/10 362/118 |
| 2004/0064486 A1* | 4/2004 | Braun | ................ | G06F 3/03545 |
| 2004/0183958 A1* | 9/2004 | Akiyama | .......... | G02F 1/133305 349/58 |
| 2005/0052435 A1* | 3/2005 | Cho | ...................... | G02F 1/1354 345/182 |
| 2006/0060393 A1* | 3/2006 | Fukushima | ......... | G06F 3/03545 178/20.03 |
| 2008/0002110 A1* | 1/2008 | Choi | ................. | G02F 1/133514 349/106 |
| 2009/0122030 A1* | 5/2009 | Morimoto | ............. | G06F 3/0321 345/179 |
| 2009/0167728 A1* | 7/2009 | Geaghan | ............. | G06F 3/03542 345/179 |
| 2009/0267895 A1* | 10/2009 | Bunch | ................... | G06F 3/0386 345/157 |
| 2010/0164434 A1* | 7/2010 | Cacioppo | ........... | G06F 3/03545 320/115 |
| 2010/0171891 A1* | 7/2010 | Kaji | ....................... | A63F 13/06 349/12 |
| 2010/0247223 A1* | 9/2010 | Ribi | ...................... | B41M 5/124 401/195 |
| 2010/0265214 A1* | 10/2010 | Green | ................... | G06F 3/038 345/174 |
| 2011/0090146 A1* | 4/2011 | Katsurahira | ........ | G06F 3/03545 345/156 |
| 2011/0179373 A1* | 7/2011 | Moore et al. | ................ | 715/773 |
| 2011/0277361 A1 | 11/2011 | Nichol et al. | | |
| 2012/0182254 A1* | 7/2012 | Jang | .................... | G06F 3/03545 345/174 |
| 2012/0192250 A1* | 7/2012 | Rakan | .................. | H04L 9/3231 726/2 |
| 2012/0230052 A1 | 9/2012 | Wakabayashi et al. | | |
| 2013/0106721 A1* | 5/2013 | Pedersen | ............ | G06F 3/03545 345/173 |
| 2013/0106796 A1* | 5/2013 | Yilmaz | ................ | G06F 3/0383 345/179 |
| 2013/0201162 A1* | 8/2013 | Cavilia | .............. | G06F 3/03545 345/179 |
| 2013/0344771 A1* | 12/2013 | Moll | ...................... | G06K 9/222 446/484 |

OTHER PUBLICATIONS

"Livescribe Smartpen User Guide Version 2.5-A", Oct. 5, 2010, p. 24-25, p. 36-37, Retrieved from the Internet on Sep. 19, 2013. URL:http://www.livescribe.com/en-gb/media/pdf/support/SmartpenUserManual.pdf.

Hideo Fujikake, "Advanced Flexible Liquid-crystal Display Technologies" Spie Newsroom, Jan. 1, 2008, col. 1, line 14-16, col. 4, line 37—col. 5, line 62, figures 3-6, 11, 12.

* cited by examiner

ELECTRONIC EQUIPMENT WITH STATUS INDICATORS

BACKGROUND

This relates generally to electronic equipment and, more particularly, to equipment that displays information such as status information to a user.

Electrical equipment is often used to display information for a user. For example, a user may view a video or read a text document using a computer display. Computers often contain status indicators for providing a user with information on operating status. For example, a portable computer may use a light-emitting diode as a status indicator to inform a user of whether or not the computer is turned on or off.

Conventional status indicator arrangements may not be satisfactory in situations in which power consumption and cost are of concern. If care is not taken, the use of conventional status indicators may drain the battery in a portable device. Cost and complexity are also concerns when using conventional arrangements for presenting a user with information such as operating status information.

It would therefore be desirable to be able to provide improved techniques for displaying information to a user of electronic equipment.

SUMMARY

Electronic equipment such as a computer tablet stylus, computing equipment, or other electronic devices may be provided with status indicators. A status indicator may be formed from a layer of liquid crystal material interposed between a pair of polarizers. Electrode structures may be used to apply electric fields to the liquid crystal material to place the status indicator in an opaque state or a transparent state. The electrode structures may be formed from layers of transparent conductive material such as indium tin oxide layers. The indium tin oxide layers may be formed as coatings on transparent substrate layers such as glass layer in the status indicator.

A colored structure or other structure may be placed under the liquid crystal material, polarizers, and electrodes to allow the status indicator to change between a dark state and a colored state. The status indicator may be provided in the shape of a ring that extends around the perimeter of a cylindrical stylus. The stylus may be used as an input device when a user is interacting with a tablet computer or other device with touch input circuitry. Multiple status indicators may be grouped in a cluster to serve as an analog gauge.

Light guide structures and light sources may provide illumination for the status indicators. The light guide structures may include solid rod structures, hollow rod structures, structures with light reflecting angled surfaces, wrapped flexible transparent sheets of material, and other clear light guiding structures. Light scattering structures such as patterns of bumps or pits may be used in scattering light from the light guiding structures through the status indicators. The status indicators may be aligned with the light scattering structures.

In portable computers, tablet computers, and other computing equipment, the status indicators may be used to display information on the sleep state of the computing equipment. Status indicators may be formed under transparent windows such as logo-shaped windows. Buttons may be illuminated using internal light sources. A status indicator may be aligned with a button so that the appearance of the button can be adjusted to reflect sleep state status or other operating status for an electronic device.

An electronic device such as a stylus may be provided with a display for displaying status information and other content. A stylus may have flat surfaces on which the display is formed or may have curved surfaces on which the display is formed. If desired, a flexible display may be wrapped around the perimeter of a stylus.

Further features of the invention, its nature and various advantages will be more apparent from the accompanying drawings and the following detailed description of the preferred embodiments.

DETAILED DESCRIPTION

Electronic equipment may be provided with components for providing output to a user. The components may include displays, status indicators, and other input-output circuitry. Electronic equipment that may be provided with these components may include computing equipment such as computers and other devices and equipment such as a stylus or other accessory. A stylus may be used, for example, to provide drawing input to a tablet computer or touch pad.

Figure 1:
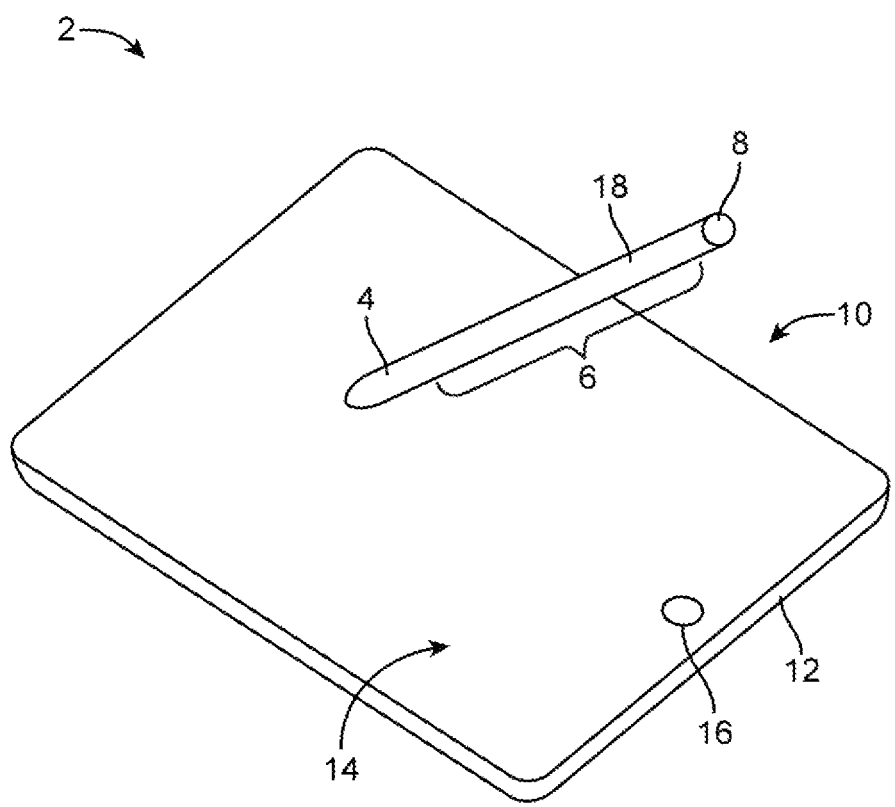
FIG. 1 is a perspective view of an illustrative system having electronic equipment such as a tablet computer and associated stylus in accordance with embodiments of the present invention.

An illustrative system of the type that may include electronic equipment with components for providing users with output is shown in FIG. 1. As shown in FIG. 1, system 2 may include electronic equipment such as electronic device 10 and stylus 18. Electronic devices such as device 10 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, equipment with touch sensitive regions for gathering touch input from a user's finger or a stylus, or other electronic equipment.

Equipment 18 may be an accessory that is used by a user to interact with electronic device 10 or may be a peer device (e.g., equipment 18 may be a device such as device 10). In configurations of the type shown in FIG. 1 in which electronic device 10 is a tablet computer, equipment 18 may, as an example, be a stylus (sometimes referred to as a tablet computer stylus or touch pad stylus). Other types of equipment may be used to interact with device 10 if desired. The illustrative configuration of FIG. 1 in which device 10 is computing equipment such as a tablet computer and in which accessory 18 is a stylus for use in interacting with the tablet computer is merely illustrative.

As shown in the example of FIG. 1, device 10 may include a display such as display 14. Display 14 may be mounted in a housing such as housing 12. Housing 12 may have upper and lower portions joined by a hinge (e.g., in a laptop computer) or may form a structure without a hinge, as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels (e.g., to increase or decrease the brightness of the image produced by the display pixels) and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as a speaker port.

In the center of display 14, display 14 may contain an array of active display pixels. The center of display 14 may therefore sometimes be referred to as the active region of display 14. A rectangular ring-shaped region may surround the periphery of the active display region and may not contain any active display pixels. This peripheral portion of display 14 may therefore sometimes be referred to as the inactive region of display 14. The display cover layer or other display layers in display 14 may be provided with an opaque masking layer in the inactive region to hide internal components from view by a user.

Openings may be formed in the opaque masking layer to accommodate light-based components. For example, an opening may be provided in the opaque masking layer to accommodate an ambient light sensor, a camera, and other sensors and components.

Stylus 18 may have an elongated shape such as the tubular shape of FIG. 1 or other suitable shapes. As shown in FIG. 1, tip 4 and eraser end 8 may be formed on opposing ends of elongated shaft 6 (sometimes referred to as barrel 6, elongated stylus member 6, or elongated body 6). Tip 4 and opposing end 8 may contain circuitry for facilitating interactions with device 10 (e.g., a pressure sensors for detecting how firmly a user is pressing tip 4 or end 8 against display 14, electronic components for ensuring that the touch sensors or other sensors in device 10 detect the user's motions of tip 4 and/or end 8 across the surface of display 14 during use, etc.).

Figure 2:
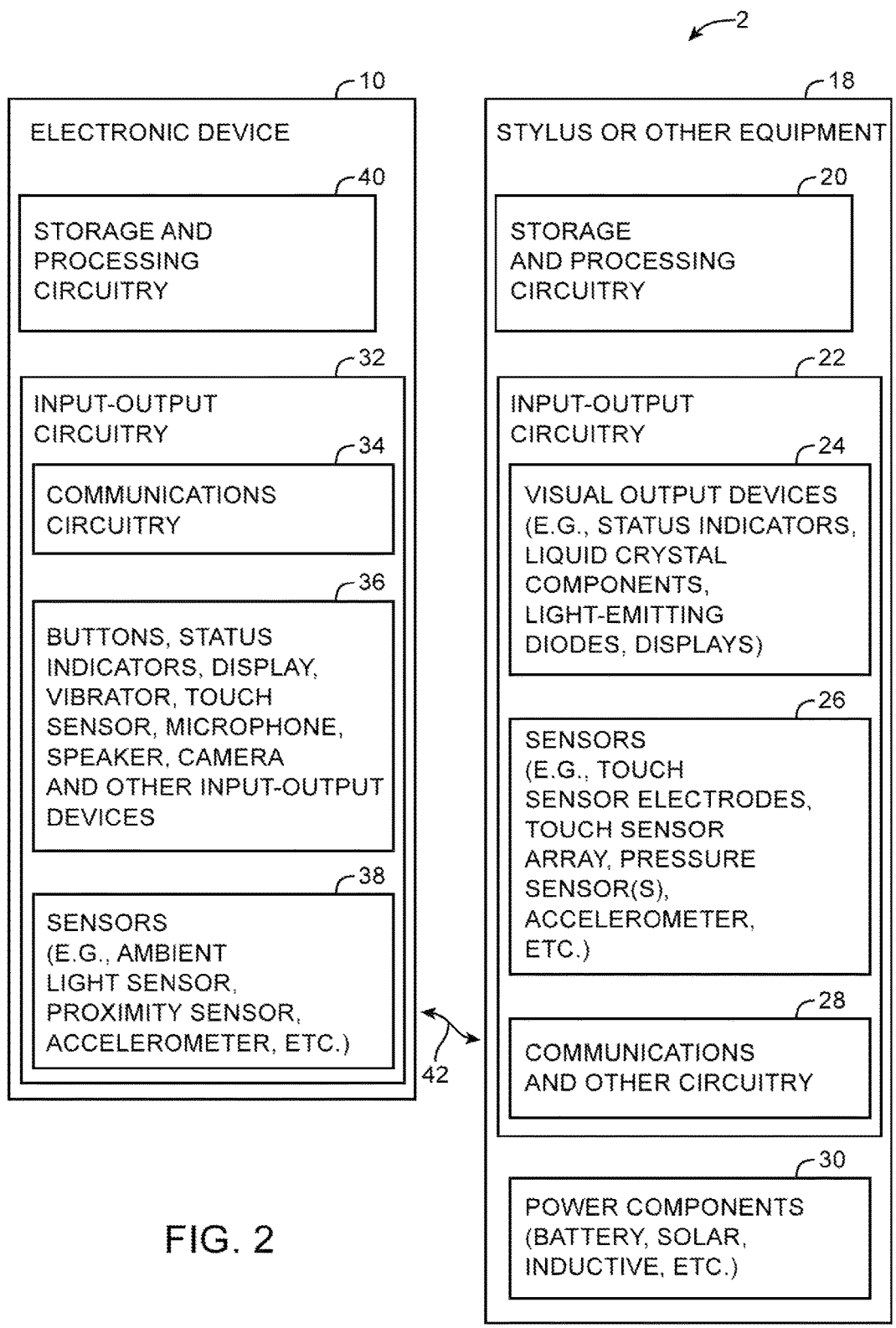
FIG. 2 is a schematic diagram of illustrative electronic equipment such as computing equipment and a stylus or other electronic equipment that interacts with the computing equipment in accordance with an embodiment of the present invention.

FIG. 2 is a schematic diagram of system 2 showing how electronic equipment such as device 10 and stylus 18 may include sensors and other components. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10, such as internet browsing applications, email applications, media playback applications, operating system functions, software for capturing and processing images, drawing applications, software implementing functions associated with gathering and processing sensor data, software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications) or other electromagnetic signals.

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor, a proximity sensor, a capacitive touch sensor array or a touch sensor formed using other touch technologies, a touch sensor that is part of a display, a pressure sensor, a temperature sensor, an accelerometer, a gyroscope, and other circuitry for making measurements of the environment surrounding device 10.

Device 10 may communicate with stylus 18 (or other equipment) as indicated by communications path 42. Path 42 may include one or more wired and/or wireless communications paths. If desired, equipment 18 may interact with device 10 using sensor measurements (e.g., pressure sensor measurements, capacitive sensor measurements, or other measurements). Device 10 and/or stylus 18 may contain sensors for making measurements and may contain components for conveying information to external equipment.

As shown in FIG. 2, stylus 18 may include control circuitry such as storage and processing circuitry 20. Storage and processing circuitry 20 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 20 may be used in controlling the operation of stylus 18. The processing circuitry may be based on a processor such as a microprocessor and other suitable integrated circuits. With one suitable arrangement, storage and processing circuitry 20 may be used to run software for implementing stylus control functions.

Input-output circuitry 22 may be used to allow data to be supplied to stylus 18 from a user or external equipment such as device 10 and to allow data to be provided from stylus 18 to a user or external devices such as device 10.

Input-output circuitry 22 may include wired and wireless communications circuitry 28. Communications circuitry 28 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications) or other electromagnetic signals.

Input-output circuitry 22 may include visual input-output devices such as visual output devices 24. Visual output equipment 24 may include status indicators, liquid crystal components, light-emitting diodes, organic light-emitting diode displays, liquid crystal displays, and other displays, etc. Input-output circuitry 22 may also include sensors 26 such as a capacitive touch sensor having an array of capacitive electrodes, touch sensors formed using other touch technologies, a single-element (one-bit) touch sensor, a one-dimensional touch sensor array, pressure sensors, accelerometers, etc. If desired, input-output circuitry 22 may be provided with other components such as buttons, joysticks, click wheels, scrolling wheels, vibrators, audio components such as microphones and speakers, image capture devices such as a camera module having an image sensor and a corresponding lens system, keyboards, tone generators, key pads, and other equipment for gathering input from a user or other external source and/or generating output for a user.

Stylus 18 may include power components 30. Power components 30 may include components such as one or more batteries, solar cells for producing power from ambient light, and inductive or capacitive near-field electromagnetic charging circuitry. If desired, stylus 18 (or other equipment 18) may receive power from a wired connection (in addition to or instead of using a battery, solar cell, or near-field coupled circuit for obtaining power). Equipment 10 may likewise have a battery, solar cell, near-field electromagnetic coupling charging circuit, and/or line power connection.

Figure 3:
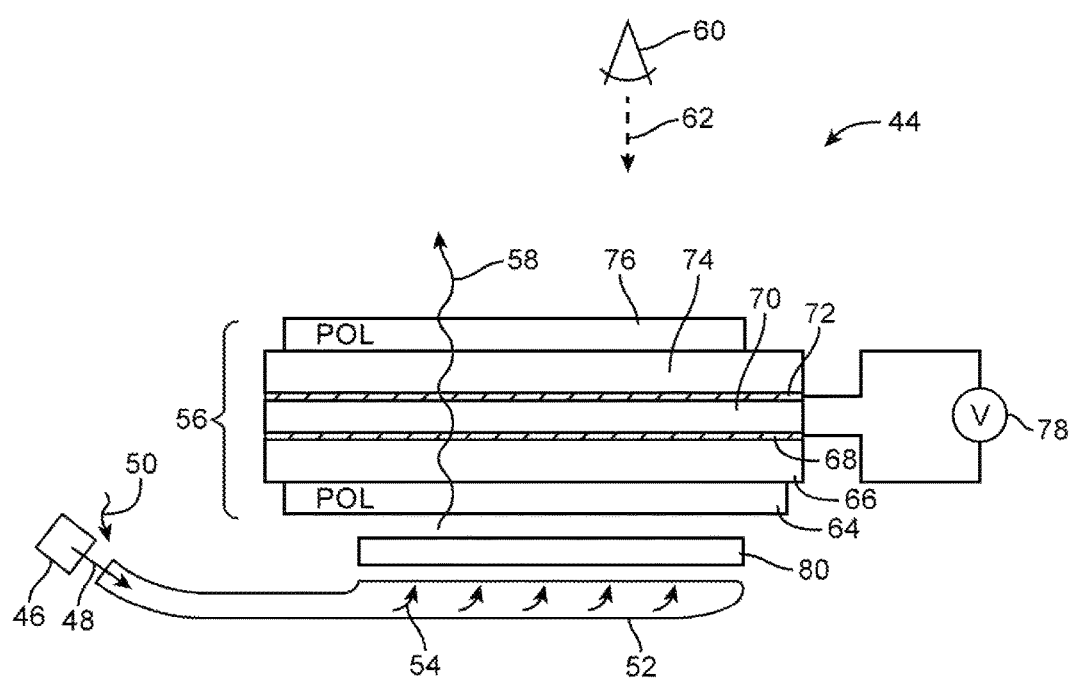
FIG. 3 is a cross-sectional side view of a liquid crystal status indicator device in accordance with an embodiment of the present invention.

Status indicators for system 2 (e.g., for device 10 and/or stylus 18) may be implemented using a liquid crystal status indicator arrangement of the type shown in FIG. 3. As shown in FIG. 3, liquid crystal status indicator 44 may have a layer of liquid crystal material such as liquid crystal layer 70. Liquid crystal layer 70 may be sandwiched between other layers in liquid crystal shutter structures 56. A signal source (e.g., control circuitry in the stylus) such as source 78 may supplied control signals to structures 56 that make structures 56 either opaque or transparent. When placed in a transparent state, viewer 60 (e.g., a user of stylus 18) may view structures such as member 80 through structures 56 in direction 62. When structures 56 are made opaque, light will be prevented from passing through structures 56, so member 80 will not be visible to viewer 60.

Member 80 may be formed from materials such as plastic, glass, paper, ceramic, metal, etc. For example, member 80 may be formed form colored plastic or a structure that is covered with a colored coating. When structures 56 are opaque, status indicator 44 will appear black to viewer 60. When structures 56 are transparent, status indicator 44 will appear to have the color of member 80. Different status indicators 44 may be provided in stylus 18 to convey different colors (or other information) to the user. For example, a red status indicator (e.g., an indicator such as indicator 44 of FIG. 3 in which member 80 is red) may be used to indicate the presence of a particular condition, whereas a green status indicator may be used to indicate the presence of another condition.

If desired, illumination such as backlight illumination may be provided for status indicator 44. As an example, a light source such as light source 46 may produce light 48 or ambient light 50 may be gathered from the surrounding environment. Light source 46 may be, for example, a single color light-emitting diode, a tricolor (controllable red/blue/green) light-emitting diode, or a white light-emitting diode. A light guiding structure such as structure 52 may convey light 54 (e.g., light 48 from light source 46 or ambient light 50) to structure 80. Light 54 may illuminate structure 80 (e.g., from the front or from the rear). In the example of FIG. 3, structure 80 is translucent, so light 54 may travel vertically through structure 80 and structures 56 for viewing by viewer 60, as indicated by light ray 58.

Shutter structure 56 may include upper polarizer 76 and lower polarizer 64. Transparent substrate layer 74 and transparent substrate layer 66 may be formed from clear plastic, clear glass, or other transparent dielectric material. Transparent electrodes 72 and 68 may be formed from a transparent conductive material such as indium tin oxide. Electrode 72 may be formed as a coating on the lower surface of substrate 74. Electrode 68 may be formed as a coating on the upper surface of substrate 66. Control circuitry 20 of stylus 18 (shown as signal source 78 in the example of FIG. 3) may apply voltages (electric fields) to liquid crystal layer 70 to rotate the liquid crystal material. The orientation of the liquid crystals in layer 70 affects the polarization state of the light passing through layers 56. In conjunction with the presence of polarizers 76 and 64, adjustment of liquid crystal layer 70 may be used to place structures 56 in either a transparent or opaque state. Status indicator 44 may be characterized by low amounts of power consumption, making status indicator 44 suitable for use in equipment that is powered by a battery (as an example).

Figure 4:
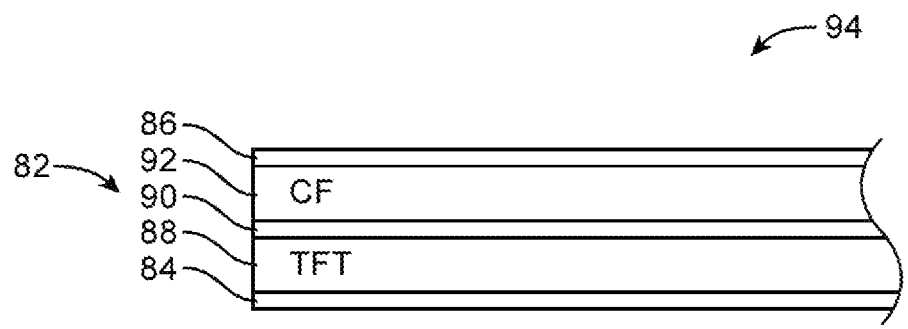
FIG. 4 is a side view of an illustrative liquid crystal display in accordance with an embodiment of the present invention.

If desired, the equipment of system 2 (e.g., stylus 18 and/or device 10) may be provided with one or more displays. An illustrative liquid crystal display is shown in FIG. 4. As shown in FIG. 4, liquid crystal display 94 may include an upper polarizer such as upper polarizer 86, a lower polarizer such as lower polarizer 84, a thin-film transistor layer such as thin-film transistor layer 88, a color filter layer such as color filter layer 92, and a layer of liquid crystal material such as liquid crystal layer 90. Thin-film transistor layer 88 may contain an array of thin-film transistors and corresponding display pixel electrodes for controlling the transmission of the display pixels of display 94. Color filter layer 92 may contain an array of color filter elements that are used to provide display 94 with the ability to display color images. Color filter layer 92 may be omitted when it is desired to display black and white images. A backlight unit may be used to provide display 94 with backlight illumination or a structure such as a white sheet may be placed under display (e.g., display 94 may be a reflective display). If desired, a colored member may be placed under display 94 (e.g., to use display 94 as a multi-element shutter as described in connection with the single-element shutter of FIG. 3).

Figure 5:
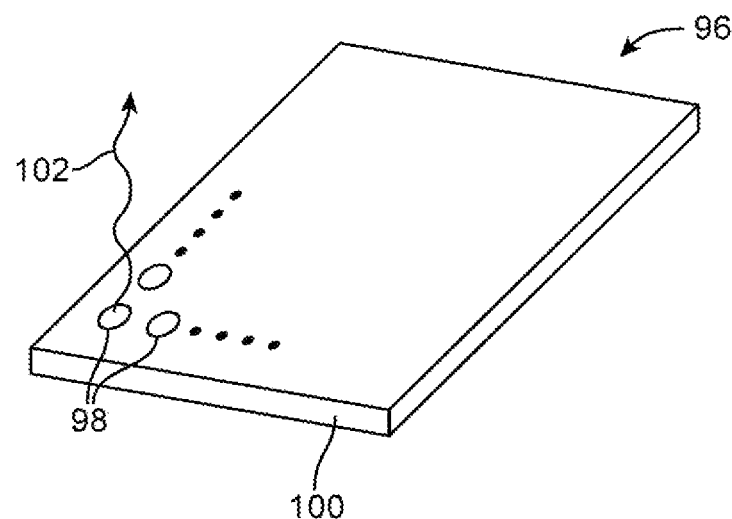
FIG. 5 is a perspective view of an illustrative display based on an array of display pixels such as an array of organic light-emitting diode display pixels in accordance with an embodiment of the present invention.

FIG. 5 is a perspective view of an illustrative display in which display pixels 98 have been formed from individual light-emitting structures such as organic light-emitting diodes. As shown in FIG. 5, light-emitting diodes 98 may be arranged in an array of rows and columns on substrate 100. Substrate 100 may be a rigid layer of material such as a layer of glass or a layer of polymer supported by a layer of glass or may be a flexible layer such as a sheet of thin flexible polymer. During operation, display pixels 98 may emit light 102 to present images to a user.

Figure 6:
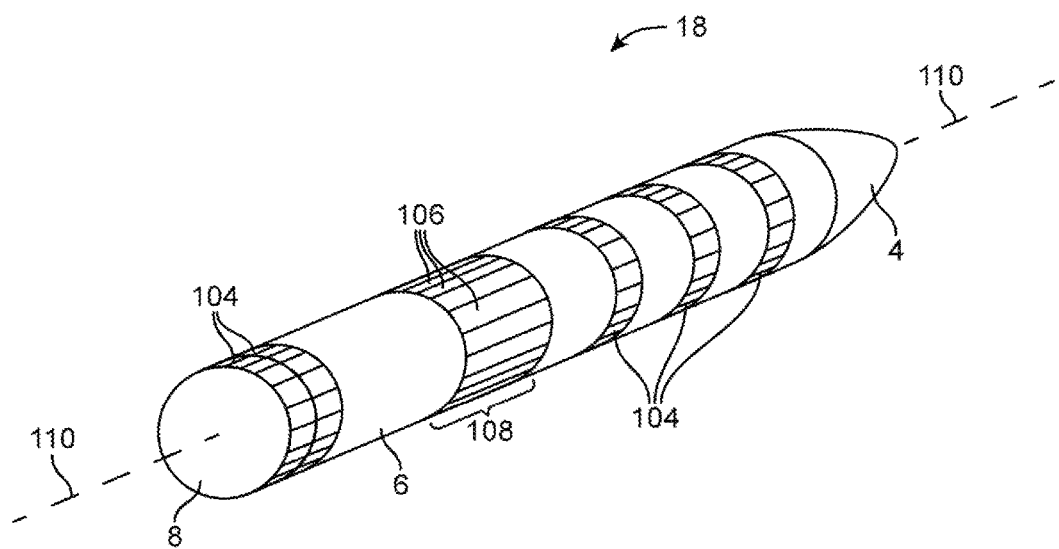
FIG. 6 is a perspective view of an illustrative stylus with input-output components such as ring-shaped and stripe-shaped status indicators in accordance with an embodiment of the present invention.

FIG. 6 is a perspective view of an illustrative stylus having status indicators such as status indicator 44 or other components (e.g., light-emitting diodes, etc.) for displaying operating status information. Status indicators typically each display one bit of information (e.g., by being in one of two states such as the illustrative opaque and transparent states of shutter structure 56 in indicator 44 of FIG. 3). If desired, a status indicator may be configured to provide a user with more information (e.g., by exhibiting high, medium, and low states, by exhibiting a continuously variable transmission level, etc.).

As shown in FIG. 6, status indicators such as status indicators 104 may be provided in ring shapes each of which extends around the perimeter of shaft 6 (i.e., the circular circumference of shaft 6 when shaft 6 is viewed in an end view along longitudinal axis 110 in the FIG. 6 example). Each ring-shaped status indicator 104 may, for example, have a different associated colored member 80 (FIG. 3) and may therefore exhibit a different color (or shade of gray) when placed in a transparent state. As an example, one of ring-shaped status indicators 104 may be red when its shutter 56 is transparent and black when its shutter 56 is opaque, whereas another of ring-shaped status indicators 104 may be green when its shutter 56 is transparent and black when its shutter 56 is opaque.

Ring-shaped status indicators 104 may be placed at one or more locations along the length of shaft 6. For example, one or more status indicators 104 may be located near end 8, one or more status indicators 104 may be located near tip 4, status indicators 104 may be distributed evenly along shaft 6, status indicators 104 may be distributed unevenly along shaft 6, or status indicators 104 may be displayed in conjunction with additional input-output devices. If desired, status indicators for stylus 18 may be formed in region 108 using status indicator elements 106 that have shapes that run parallel to longitudinal axis 110 of stylus 18 and that are distributed circumferentially around the perimeter of shaft 6.

Status indicators such as status indicators 104 and 106 of FIG. 6 (e.g., status indicators implemented using liquid crystal structures of the type used by status indicator 44 of FIG. 3) may be used to display information on the operating status of equipment such as stylus 18 and/or device 10. Examples of status information that can be conveyed using status indicators include information on whether equipment (e.g., stylus 18 and/or device 10) is in a powered on state or is in a powered off state (or is in a low-power sleep state), information on a color being used to draw lines in a drawing program, line width information in a drawing program, or other information regarding the use of a drawing program or other image-editing application using stylus 18 (e.g., which drawing tool is active, which drawing mode is being used, whether stylus 18 is being used to draw or is being used to erase, etc.). These are merely illustrative examples. Any information associated with the use of equipment such as equipment 10 and/or equipment 18 may be displayed using status indicators if desired.

Figure 7:
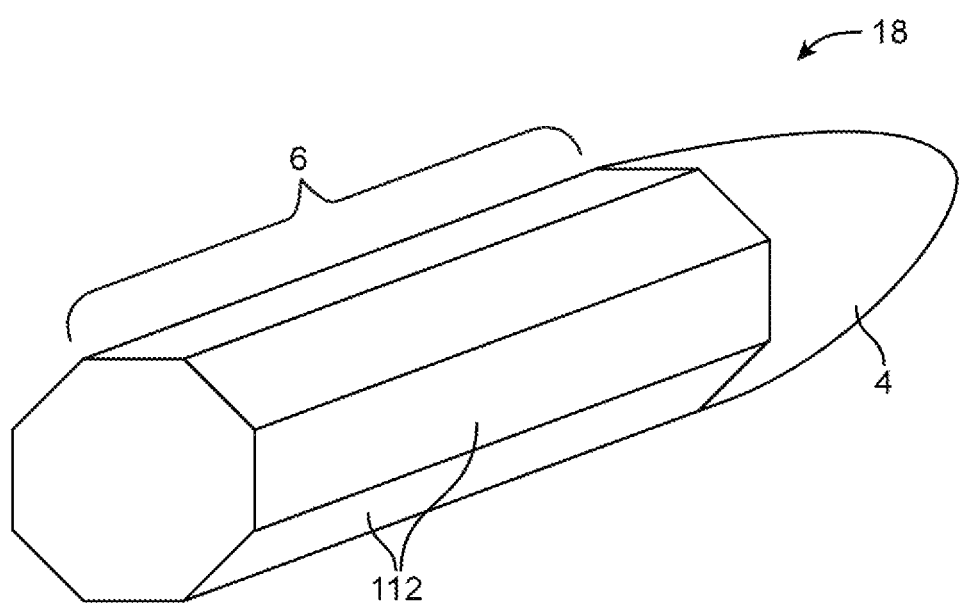
FIG. 7 is a perspective view of an illustrative stylus showing how the stylus may be provided with a barrel having flat surfaces in accordance with an embodiment of the present invention.

As shown in FIG. 7, stylus 18 may be provided with flat (planar) surfaces on shaft 6 such as surfaces 112. There may be eight surfaces 112 arranged evenly around the perimeter of shaft 6 or there may be fewer than eight planar surfaces or more than eight planar surfaces.

Figure 8:
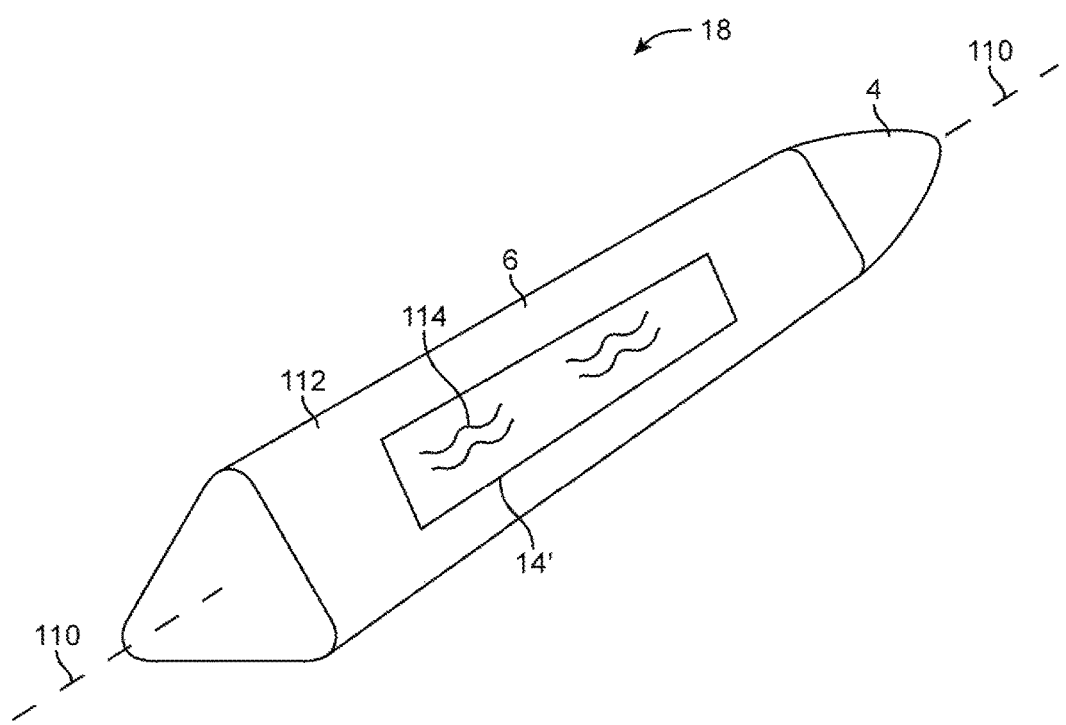
FIG. 8 is a perspective view of an illustrative stylus having a barrel with a display in accordance with an embodiment of the present invention.

In the example of FIG. 8, stylus 18 has been implemented using a shaft (shaft 6) with three planar surfaces arranged to provide shaft 6 with a triangular cross section when viewed along longitudinal axis 110. As shown in FIG. 8, stylus 18 may be provided with a display such as display 14' for displaying content 114 for a user. Display 14' may be a liquid crystal display such as liquid crystal display 94 of FIG. 4, an organic light-emitting diode display such as organic light-emitting diode display 96 of FIG. 5, or other suitable display. Status indicators such as status indicator 44 of FIG. 3 may be used on shaft 6 in addition to one or more displays such as display 14' Display 14' may be used to display information on drawing program status or other content of interest to the user of stylus 18. One of the planar surfaces in stylus 18 may be provided with a display or more than one of the planar surfaces in stylus 18 may be provided with a display. Displays may also be provided on curved stylus surfaces.

Figure 9:
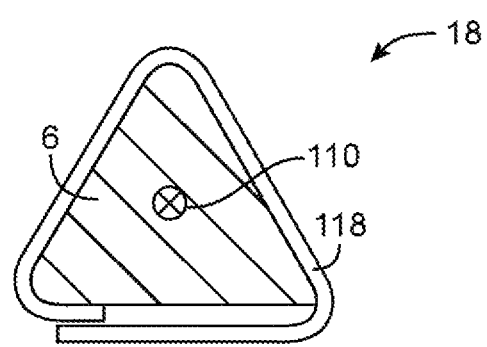
FIG. 9 is cross-sectional end view of an illustrative stylus having a wrapped flexible display layer in accordance with an embodiment of the present invention.

FIG. 9 is a cross-sectional end view of stylus 18 in a configuration in which flexible display layer 118 has been wrapped around the outer surface of shaft 6 to form a display. In the configuration of FIG. 9, shaft 6 has three planar surfaces and a triangular cross-sectional shape. This is merely illustrative. Shaft 6 may have a circular cross-sectional shape, a cross section with a combination of curved and flat regions, or other suitable shape. Flexible display layer 118 may be a flexible organic light-emitting diode display or may include flexible display layers using other types of display technology (e.g., liquid crystal technology, electrophoretic display technology, electrowetting display technology, etc.).

Figure 10:
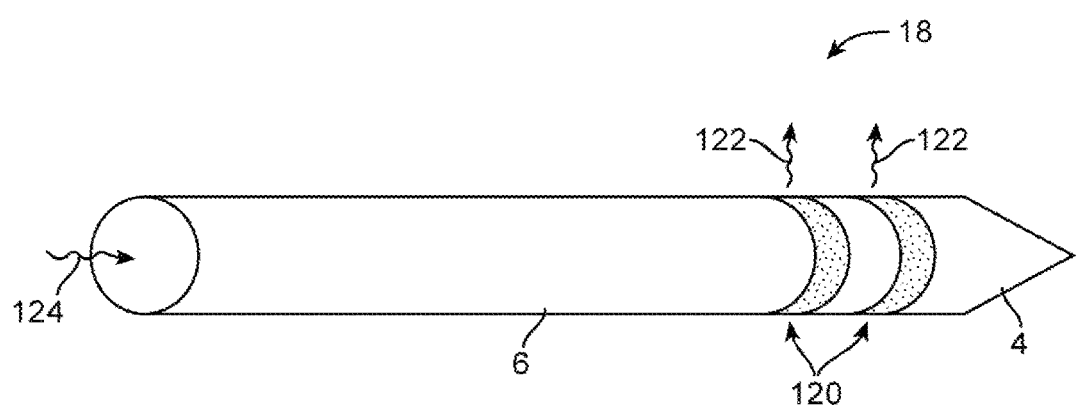
FIG. 10 is a perspective view of an illustrative stylus having roughened areas for scattering light to provide illumination for status indicators in accordance with an embodiment of the present invention.

FIG. 10 shows how shaft 6 of stylus 18 may be provided with light scattering features such as structures 120. Shaft 6 may, for example, include a solid rod portion or other portions that are formed from clear materials such as plastic. Light may propagate within the plastic (e.g., shaft 6 may have portions that serve as a light guide). When scattering features such as structures 120 are encountered by the light within shaft 6, the light will be scattered outwards in directions 122 to serve as backlight for overlapping status indicators 44. Scattering structures 120 may be formed from bumps, pits, voids, ridges, troughs, rough textured structures, beads of material having an index of refraction that differs from the index of refraction of the light-guiding structures in shaft 6, etc. Light such as light 124 (e.g., light from a light-emitting diode or ambient light) may be used to supply the light that scatters from structures 120.

Figure 11:
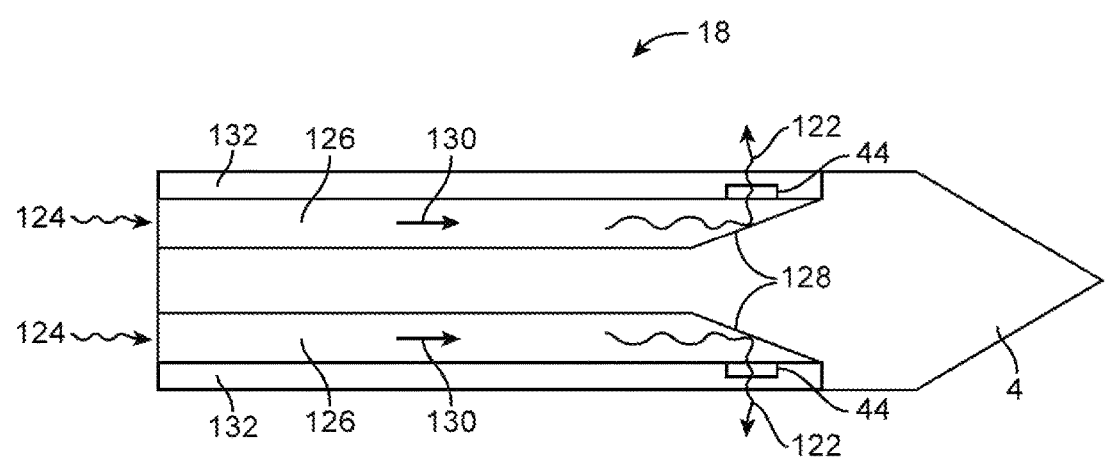
FIG. 11 is a cross-sectional side view of an illustrative stylus having light-guiding structures for providing a status indicator with backlight in accordance with an embodiment of the present invention.

FIG. 11 is a cross-sectional side view of stylus 18 in a configuration in which a clear hollow tube such as a plastic tube is being used to form light guiding structures 126 for stylus 18. Light 124 may propagate in direction 130 within light guiding structures 126 due to the principal of total internal reflection. Structures 126 may have angled surfaces 128 that cause light 124 to reflect radially outwards through status indicator 44 as light 122. A clear protective polymer coating such as coating 132 may be used to cover and protect status indicator 44, if desired.

Figure 12:
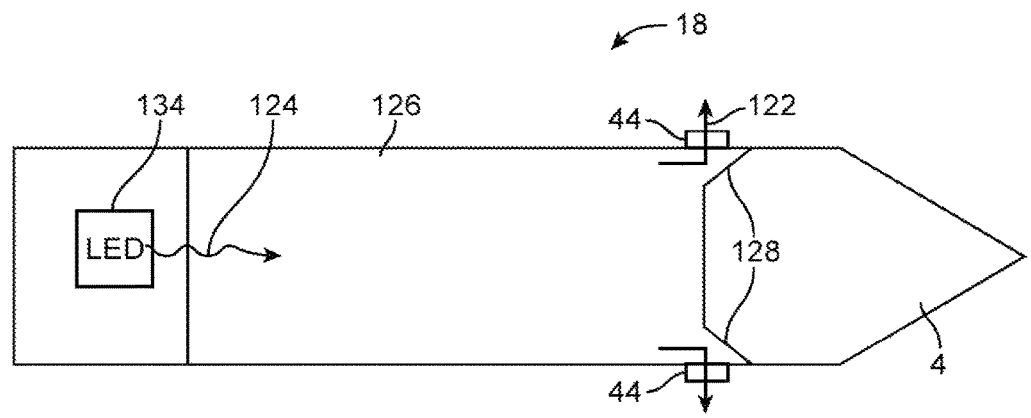
FIG. 12 is a cross-sectional side view of an illustrative stylus having a light-emitting diode that provides backlight and light guiding structures that guide the backlight radially outward in accordance with an embodiment of the present invention.

In the illustrative configuration of FIG. 12, light 124 is being produced by a light source such as light-emitting diode 134. Light-guiding structures 126 in the FIG. 12 configuration are formed from a solid clear rod of material that forms shaft 6. Angled surfaces 128 may be formed on the leading surface of the rod to reflect light 124 outwards as light 122.

Figure 13:
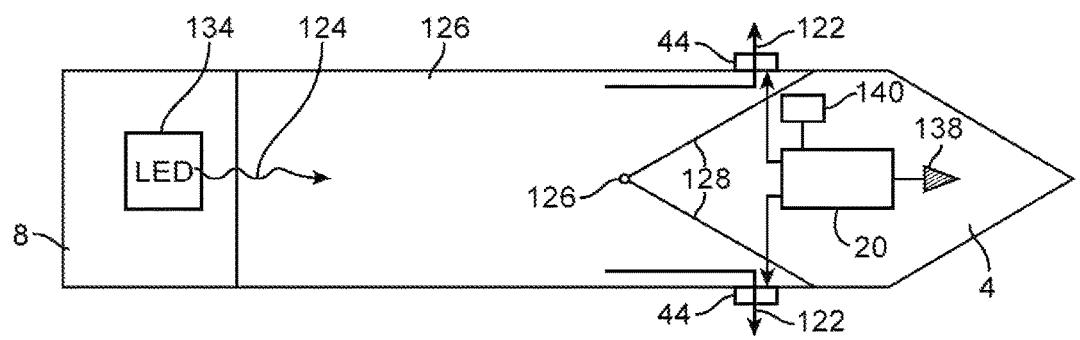
FIG. 13 is a cross-sectional side view of an illustrative stylus having a light-emitting diode that provides backlight, light guiding structures, and a pressure sensitive tip in accordance with an embodiment of the present invention.

FIG. 13 is a side view of an illustrative configuration for stylus 18 in which angled portions 128 meet at point 136. Pressure sensor 138 may be used to gather information on how forcefully a user is pressing tip 4 against device 10. If desired, a pressure sensor may also be provided at end 8. Accelerometer 140 may be used to gather information on the orientation of stylus 18 toward the surface of the Earth (e.g., by analyzing the force and direction of the Earth's gravity). Control circuitry 20 may analyze data from sensors such as sensors 138 and 140 and may control the operation of stylus 18 accordingly. Control circuitry 20 may display operating status information and other information on displays such as display 14' of FIG. 8, display 118 of FIG. 9, and status indicators 44.

Figure 14:
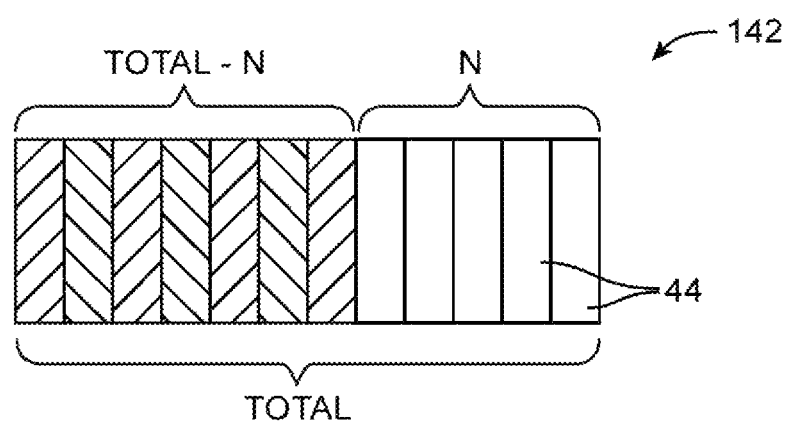
FIG. 14 is a diagram of an illustrative status indicator structure that is formed from a cluster of status indicators and that is being used on a stylus to provide a user of the stylus with information on a current line width being used in associated with a drawing program that is receiving input from the stylus in accordance with an embodiment of the present invention.

Multiple status indicators may be placed in close proximity to each other in a cluster on the surface of stylus 18 to serve as an analog gauge. An example of this type of arrangement is shown in FIG. 14. As shown in FIG. 14, information may be displayed on status indicators 44 by placing N status indicators 44 in a transparent (colored) state. In this configuration there are TOTAL-N status indicators in an opaque (black) state, where TOTAL represents that total number of status indicators 44 in status indicator cluster 142. The value of N may be adjusted to represent a scalar value associated with the operation of stylus 18. Status indicator structures 142 may, for example, be used to display status information such as the line width being used by a drawing program as stylus 18 is being used to draw lines on device 10 or other information benefiting from an analog-type gauge.

Figure 15:
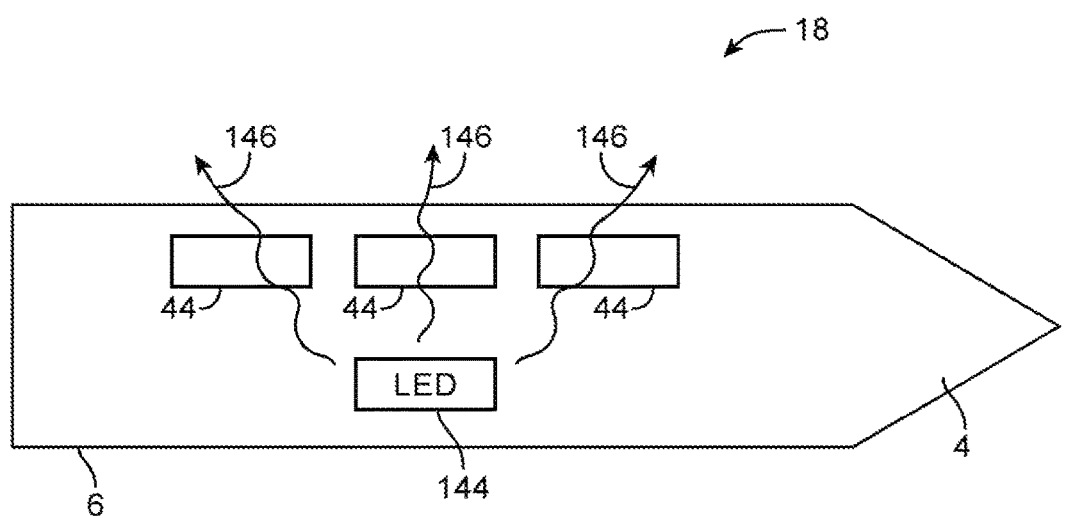
FIG. 15 is a cross-sectional side view of an illustrative stylus showing how a single light-emitting diode may provide illumination for multiple components such as status indicators in accordance with an embodiment of the present invention.

One or more light sources such as light-emitting diode 144 of FIG. 15 may be used to provide backlight illumination for one or more status indicators. In the illustrative configuration of FIG. 15, a single light-emitting diode is being used to provide illumination 146 for three associated status indicators 44. Other numbers of status indicators 44 may be illuminated in this way if desired. Light guiding structures may be used to guide light within stylus 18 and to gather light from exterior sources (i.e., to gather ambient light).

Figure 16:
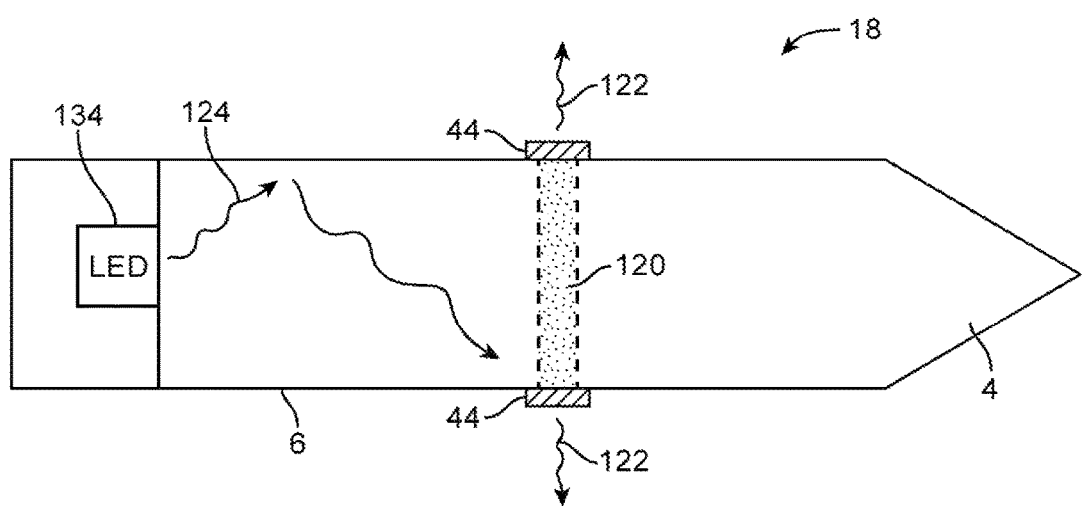
FIG. 16 is a cross-sectional side view of an illustrative stylus having a light-emitting diode that provides light for status indicators and having a light-scattering structure to promote scattering of the light in accordance with an embodiment of the present invention.

FIG. 16 is a cross-sectional side view of stylus 18 in a configuration in which shaft 6 has been formed from a clear solid rod and in which light-scattering structures 120 have been formed within an interior portion of the rod in alignment with status indicator 44.

Figure 17:
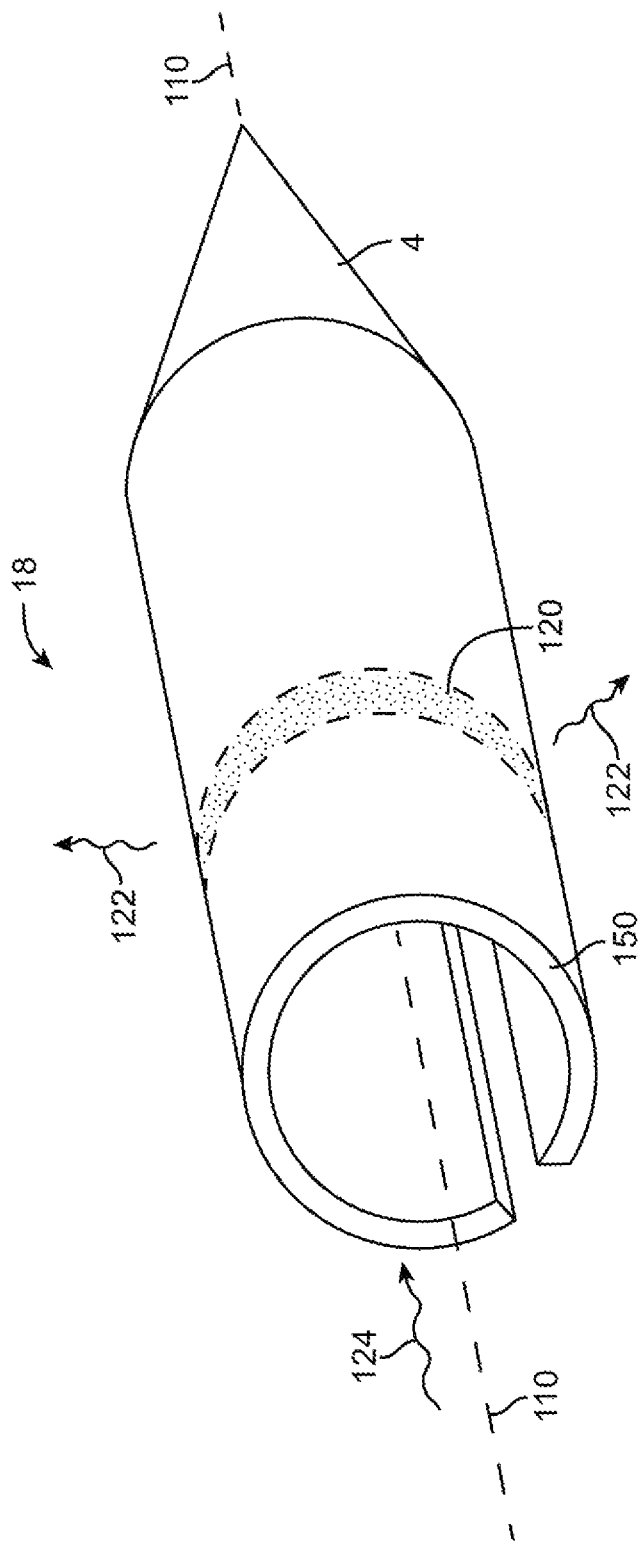
FIG. 17 is a perspective view of a portion of a light guide structure formed from a wrapped sheet of transparent material in an illustrative stylus in accordance with an embodiment of the present invention.

If desired, light guiding structures in stylus 18 may be formed from a wrapped flexible layer of light guide material. This type of configuration is shown in FIG. 17. As shown in FIG. 17, stylus 18 may be provided with a wrapped clear flexible layer of material (e.g., a clear polymer sheet) such as layer 150. Layer 150 may be wrapped around an internal plastic cylindrical support structure or other shaft structure (e.g., around a structure that is elongated along longitudinal axis 110, so that layer 150 is wrapped around axis 110). Light 124 may be injected into the exposed ends of layer 150 from a light-emitting diode such as light-emitting diode 134 of FIG. 16. Light from the light-emitting diode may propagate within layer 150 due to the principal of total internal reflection. Upon reaching light scattering structures 120, the light in light guide layer 150 may be scattered outwards in direction 122 to provide illumination for an overlapping ring-shaped status indicator 44.

Figure 18:
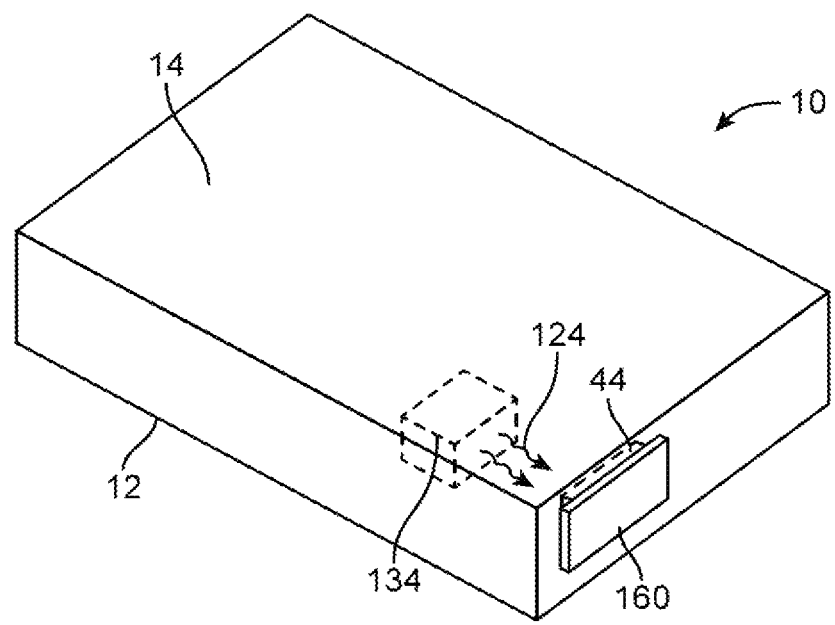
FIG. 18 is a perspective view of an electronic device with a button that serves as a status indicator in accordance with an embodiment of the present invention.

Status indicators such as status indicator 44 of FIG. 3 may, if desired, be used in electronic device 10 or other electronic equipment in system 2. Consider, as an example, device 10 of FIG. 18. As shown in FIG. 18, device 10 may have a display such as display 14 mounted in housing 12. Light 124 may be produced by an optional light source such as light-emitting diode 134 or may be gathered from ambient light sources (e.g., using light-guiding structures).

Device 10 may be a computer or other device (e.g., a stylus) having one or more buttons such as button 160. Button 160 may be formed from a clear member such as a clear plastic structure or a piece of glass or ceramic. Status indicator 44 may be located under button 160 or may be integrated into button 160. Because status indicator 44 and button 160 overlap, light 124 can be blocked or allowed to pass by controlling the state of shutter structure 56 in status indicator 44 (FIG. 3).

The state of status indicator 44 may be used to provide a user of device 10 with status information. For example, when device 10 is in an active normal mode of operation, status indicator 44 may be placed in a transparent state so that a green structure is visible through button 160 (i.e., button 160 will appear green). When device 10 is in a sleep state, button 160 may be made to appear black by controlling status indicator 44 so that status indicator 44 becomes opaque. If desired, a red status indicator color may be made to appear on button 160 when device 10 is in the sleep state (e.g., by using an additional status indicator 44 in parallel with the green status indicator).

Figure 19:
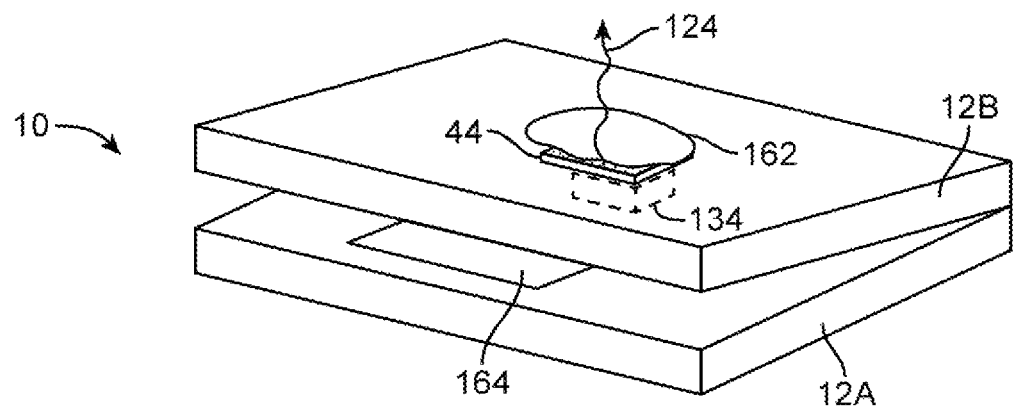
FIG. 19 is a perspective view of a portable computer with a status indicator in accordance with an embodiment of the present invention.

Another illustrative configuration for device 10 (or a stylus or other equipment) is shown in FIG. 19. Device 10 of FIG. 19 may be, for example, a portable computer having a base such as base housing 12A with track pad 164 and an upper housing such as upper housing 12A with translucent logo 162 or other transparent window structure. Light source 134 may produce light 124, ambient light may be gathered using a light guiding structure or other arrangement, or light 124 may be produced using backlight that has leaked from a display light guide plate. Status indicator 44 may be controlled to control the color of logo 124. When status indicator 44 is placed in its opaque state, for example, logo window 162 may be dark. When status indicator 44 is placed in its transparent state, logo window 162 may become brighter due to the presence of light 124 (e.g., window 162 may appear white or otherwise brighter than when status indicator 44 is opaque).

Devices such as devices 10 of FIGS. 1, 18, and 19 and other electronic equipment that includes status indicators such as status indicator 44 of FIG. 3 may have components of the type shown by device 10 and/or equipment 18 of FIG. 2.

Figure 20:
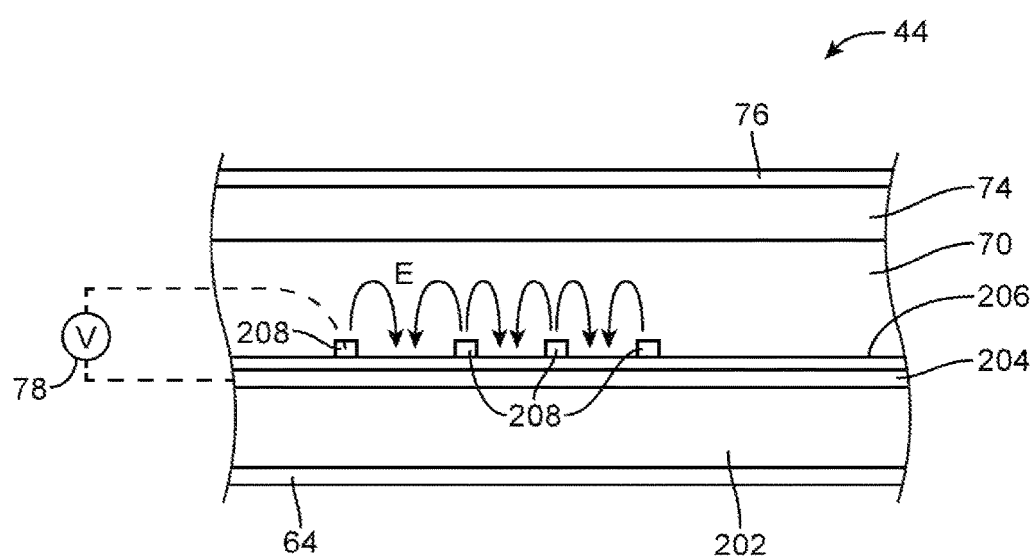
FIG. 20 is a cross-sectional side view of a liquid crystal status indicator device based on an in-plane switching structure in accordance with an embodiment of the present invention.

A status indicator such as liquid crystal status indicator 44 for a stylus or other electronic device may be implemented using a configuration of the type shown in FIG. 3 in which liquid crystal material 70 is interposed between upper indium tin oxide electrode 72 and lower indium tin oxide electrode 68 or may be implemented using other configurations. As an example, liquid crystal status indicator 44 may be implemented using in-plane switching liquid crystal structures. FIG. 20 is a cross-sectional side view of a liquid crystal status indicator device based on in-plane switching structures. As shown in FIG. 20, status indicator 44 may include an upper substrate such as substrate 74 and a lower substrate such as substrate 202. Substrates 74 and 202 may be formed from materials such as clear glass or plastic. Liquid crystal material 70 may be interposed between substrates 74 and 202. Upper polarizer 76 may be formed on the upper surface of substrate 74. Lower polarizer 64 may be formed on the lower surface of substrate 202. Common voltage electrode 204 may be formed from a blanket layer of transparent conductor such as indium tin oxide. Positive electrode 208 may be formed from thin fingers of metal (as an example). When voltage source 78 applies a control voltage V between electrodes 208 and 204, an electric field E may be formed in liquid crystal material 70 that rotates the liquid crystals in material 70 and thereby controls the amount of light transmission through status indicator 44.

Figure 21:
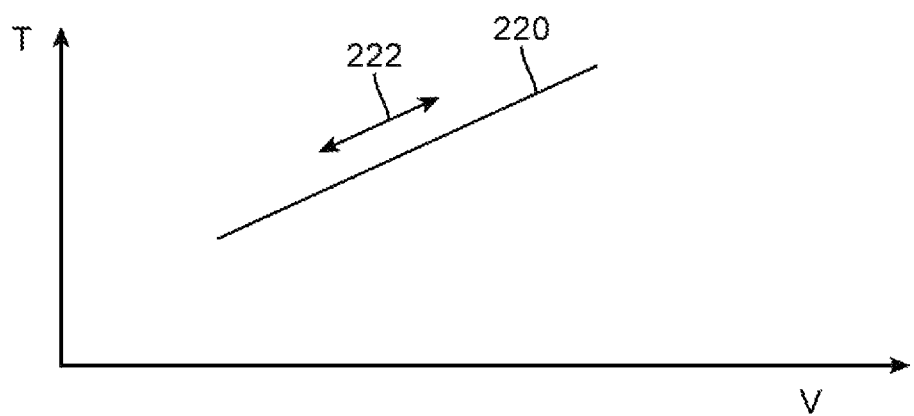
FIG. 21 is a graph showing how transparency may be continuously adjusted by varying a control voltage for a liquid crystal status indicator device in accordance with an embodiment of the present invention.

The amount of transmission exhibited by status indicator 44 may, if desired, be varied continuously in an analog fashion. FIG. 21 is a graph showing how transmission T of status indicator 44 may vary continuously with applied voltage V from signal source 78. As indicated by arrow 222 and curve 220, source 78 may vary the value of V up and down in real time to create a flashing status indicator output (e.g., a logo-shaped indicator or other indicator that varies from white to black continuously) or may otherwise smoothly vary the transparency of the status indicator to control the visibility of underlying colored structures or other information under status indicator 44.

Figure 22:
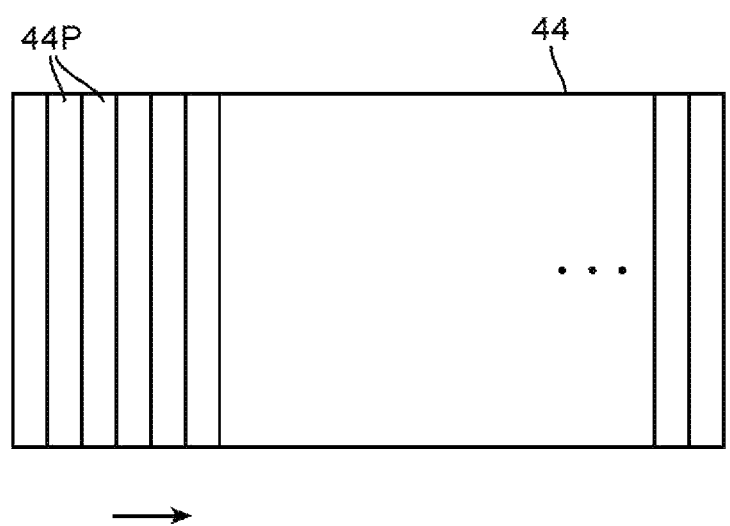
FIG. 22 is a diagram of a logo that has been provided with a set of strip-shaped liquid crystal structures so that the logo can be provided with a side-to-side visual effect while serving as a status indicator in accordance with an embodiment of the present invention.

If desired, a logo or other feature an accessory or other electronic device may be provided with multiple liquid crystal structures to serve as a status indicator. An illustrative status indicator of this type is shown in FIG. 22. Status indicator 44 of FIG. 22 may have the shape of a rectangle, a logo, a shape with curved edges, a shape with straight edges, or a shape with both straight and curved edges. Individually controllable status indicator portions 44P may be arranged so as to cover the entire area of status indicator 44 (as an example). In the example of FIG. 22, portions 44P have the shape of vertically extending strips. Individually controlled liquid crystal elements such as structures 44P may be formed using other shapes, if desired.

Using an arrangement of the type shown in FIG. 22 in which spatially distinct and individually controllable elements such as elements 44P cover the surface of indicator 44 allows indicator 44 to present information using side-to-side visual effects or other motion effects. For example, each of elements 44P may be made more transparent in sequence to provide indicator 44 with the appearance of side to side movement. This type of side-to-side visual effect may, if desired, be imposed on top of collective dimming and brightening of the elements of indicator 44 or other global effects.

Figure 23:
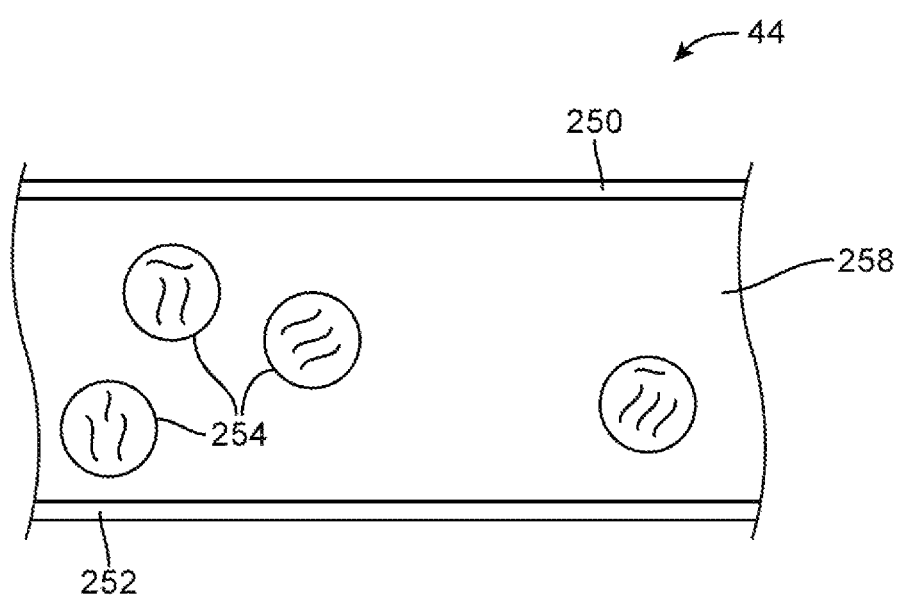
FIG. 23 is a cross-sectional side view of a liquid crystal status indicator device based on a polymer dispersed liquid crystal structure in accordance with an embodiment of the present invention.

Liquid crystal status indicator 44 may, if desired, be implemented using structures such as polymer dispersed liquid crystal structures. Polymer dispersed liquid crystal structures may function as light collectors and may therefore be suitable for use in equipment where no supplemental backlighting is available. A cross-sectional side view of a polymer dispersed liquid crystal structure is shown in FIG. 23. As shown in FIG. 23 status indicator 44 may include a polymer such as polymer 258. Droplets of liquid crystal material such as liquid crystal droplets 254 may be interspersed amount polymer 258. Each droplet 254 may have a diameter of about 1-10 microns (as an example). A voltage may be applied to liquid crystal droplets 254 using transparent electrodes such as upper and lower indium tin oxide electrodes 250 and 252. The voltage rotates the liquid crystals to adjust the index of refraction of each of the droplets and thereby adjusting the difference in index of refraction between the droplets and polymer 258. As the voltage across terminals 250 and 252 is adjusted, the transparency of status indicator structures 44 is varied from opaque to clear.

Figure 24:
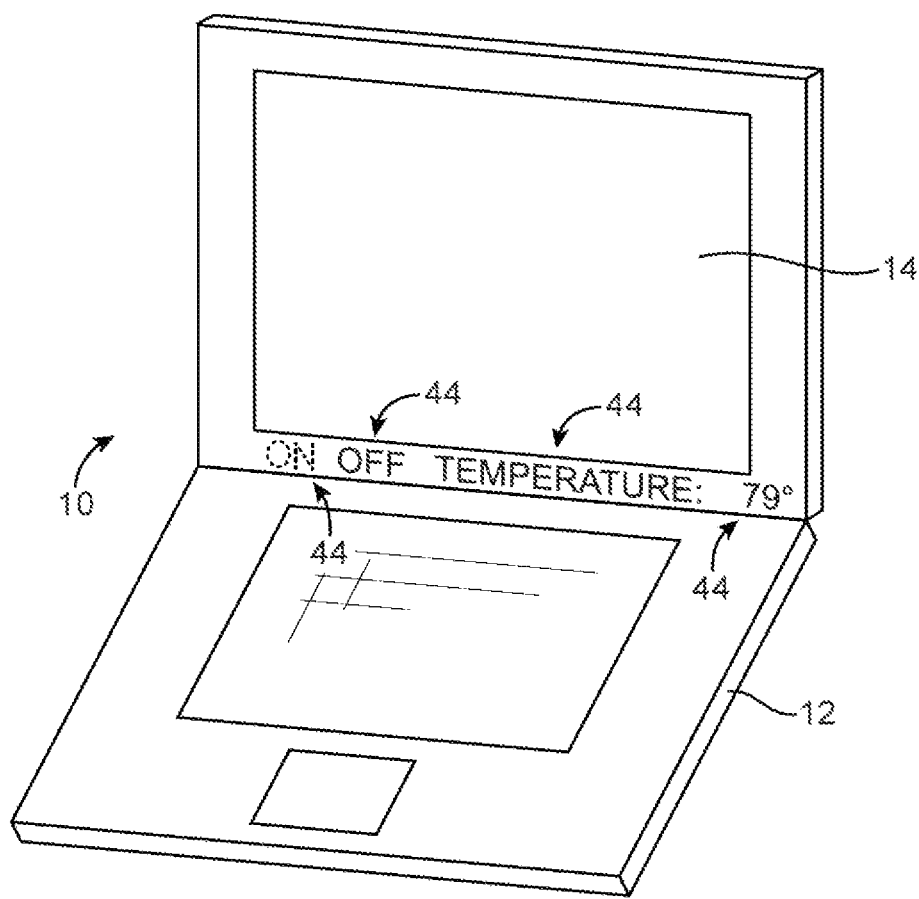
FIG. 24 is a perspective view of an electronic device such as a laptop computer that has been provided with liquid crystal status indicators in accordance with an embodiment of the present invention.

Liquid crystal status indicators 44 may be used in displaying information on a laptop computer such as computer 10 of FIG. 24. As shown in FIG. 24, status indicators may be used to display status information such as whether computer 10 is in an "ON" mode or is in an "OFF" mode. Status indicators 44 may also display information on whether computer 10 is in a low power sleep state, etc. Information such as temperature information and other information about the environment or operating status of computer 10 may be display. Status indicators 44 may be mounted in housing 12 around the periphery of display 14 (e.g., in an inactive border region of display 14) or elsewhere in computer 10 or other electronic equipment. In the FIG. 24 example, computer 10 is a portable computer such as a laptop computer. If desired, a stylus, a computer integrated into a computer display, or other equipment may use stylus indicators such as stylus indicators 44 of FIG. 24.

The foregoing is merely illustrative of the principles of this invention and various modifications can be made by those skilled in the art without departing from the scope and spirit of the invention. The foregoing embodiments may be implemented individually or in any combination.

What is claimed is:
1. A tablet computer stylus, comprising:
  a shaft extending between a tip portion and an opposing end portion; and
  a status indicator on the shaft, wherein the status indicator has a layer of liquid crystal material interposed between first and second transparent dielectric members, upper and lower polarizers, and electrode structures that apply electric fields to the liquid crystal material to place the status indicator in either a first state or a second state, wherein the status indicator comprises a colored structure that is visible through the liquid crystal material when the status indicator is in the second state, wherein the status indicator is opaque in the first state, wherein the status indicator is transparent in the second state, and wherein the status indicator is always in the first or second state
  wherein the shaft has a perimeter and wherein the status indicator comprises a ring-shaped structure that surrounds the perimeter;
  further comprising light guiding structures that guide light, wherein at least some of the light passes through the liquid crystal material.

2. The tablet computer stylus defined in claim 1 wherein the light guiding structures comprise a transparent rod.

3. The tablet computer stylus defined in claim 2 wherein the light guiding structures comprise light scattering structures aligned with the status indicator.

4. The tablet computer stylus defined in claim 1 wherein the shaft has a length and a perimeter and wherein the light guiding structures comprise a sheet of transparent material that is wrapped at least partly around the perimeter of the shaft.

5. The tablet computer stylus defined in claim 4 wherein the sheet of transparent material comprises light scattering structures that are aligned with the status indicator.

6. The tablet computer stylus defined in claim 5 further comprising a pressure sensor in the tip.

7. The tablet computer stylus defined in claim 1 further comprising a display on the shaft.

8. The tablet computer stylus defined in claim 7 wherein the shaft has a length and a perimeter and wherein the display comprises a flexible organic light-emitting diode layer wrapped at least partly around the perimeter of the shaft.

9. The tablet computer stylus defined in claim 1, wherein the first and second transparent dielectric members comprise plastic.

10. The tablet computer stylus defined in claim 1, wherein the colored structure is formed from a material selected from the group consisting of: paper, ceramic, and metal.

11. The tablet computer stylus defined in claim 1, wherein the electrode structures include a first electrode and a second electrode, wherein the first electrode is formed as a coating on a lower surface of the first transparent dielectric member, and wherein the second electrode is formed as a coating on an upper surface of the second transparent dielectric member.

12. The tablet computer stylus defined in claim 1, wherein the entire status indicator appears red when the status indicator is in the second state and the entire status indicator appears black when the status indicator is in the first state.

13. The tablet computer stylus defined in claim 1, wherein the entire status indicator appears green when the status indicator is in the second state and the entire status indicator appears black when the status indicator is in the first state.

14. The tablet computer stylus defined in claim 1, wherein the colored structure has a color, and wherein the entire status indicator appears the color of the colored structure when the status indicator is in the second state and the entire status indicator appears black when the status indicator is in the first state.

15. The tablet computer stylus defined in claim 1, wherein all of the liquid crystal material in the status indicator is opaque when the status indicator is in the first state and wherein all of the liquid crystal material in the status indicator is transparent when the status indicator is in the second state.

16. An electronic device comprising:
  storage and processing circuitry; a display with which the storage and processing circuitry displays content for a user; input-output circuitry configured to receive input from a user of the electronic device;
  a status indicator that the storage and processing circuitry controls to display status information for the user, wherein the status indicator includes first and second polarizer layers, a layer of liquid crystal material, a first transparent member interposed between the first polarizer layer and the layer of liquid crystal material, a second transparent member interposed between the second polarizer and the layer of liquid crystal material, and electrode structures with which the storage and processing circuitry applies electric fields to the liquid crystal material to place the status indicator in a selected one of: an opaque state and a transparent state; and a button that includes a clear plastic member, wherein the button overlaps the status indicator and the status indicator is viewable through the clear plastic member of the button.

17. The electronic device defined in claim 16 further comprising a tip and an opposing end separated by an elongated shaft in which the display is mounted.

18. The electronic device defined in claim 17 wherein the shaft has a perimeter and a length and wherein the status indicator comprises one of a plurality of ring-shaped status indicators that each extend around the perimeter and that are arranged along the length.

19. The electronic device defined in claim 16, wherein the status indicator is formed separately from the button.

20. A tablet computer stylus, comprising:
a shaft extending between a tip portion and an opposing end portion;
a plurality of status indicators on the shaft, wherein the plurality of status indicators are arranged in a cluster to serve as an analog gauge and each status indicator comprises:
first and second transparent dielectric members; upper and lower polarizers; a layer of liquid crystal material interposed between the first and second transparent dielectric members and the upper and lower polarizers; and
electrode structures that apply electric fields to the layer of liquid crystal material to place the status indicator in either a first state in which a colored structure is visible through the layer of liquid crystal material or a second state in which the layer of liquid crystal material is opaque and the status indicator appears black; and
control circuitry configured to place a first number of adjacent status indicators of the plurality of status indicators in the first state and a remaining number of adjacent status indicators of the plurality of status indicators in the second state to display information on the analog gauge.

21. The tablet computer stylus defined in claim 20, wherein the control circuitry is configured to adjust the first number of adjacent status indicators of the plurality of status indicators in the first state and the remaining number of adjacent status indicators of the plurality of status indicators in the second state to represent a scalar value.

22. The tablet computer stylus defined in claim 21, wherein the control circuitry is configured to display line width information on the analog gauge.

* * * * *